(12) United States Patent
Hursey et al.

(10) Patent No.: US 8,027,436 B1
(45) Date of Patent: Sep. 27, 2011

(54) USER INITIATED VOICE MAIL RESET SYSTEM

(75) Inventors: John T. Hursey, Lawrenceville, GA (US); Kenneth James DiPrima, Jr., Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1314 days.

(21) Appl. No.: 11/379,261

(22) Filed: Apr. 19, 2006

(51) Int. Cl.
*H04M 1/64* (2006.01)

(52) U.S. Cl. .................. 379/67.1; 379/221.09

(58) Field of Classification Search .......... 379/67, 379/88, 67.1, 88.14; 455/414, 410
See application file for complete search history.

(56) References Cited

U.S. PATENT DOCUMENTS

| 6,393,274 | B1 * | 5/2002 | Peltonen | 455/414.1 |
| 6,601,068 | B1 * | 7/2003 | Park | 1/1 |
| 7,215,754 | B1 * | 5/2007 | Woodson et al. | 379/221.09 |
| 2004/0229601 | A1 * | 11/2004 | Zabawskyj et al. | 455/417 |

* cited by examiner

*Primary Examiner* — Curtis Kuntz
*Assistant Examiner* — Amal Zenati
(74) *Attorney, Agent, or Firm* — Parks IP Law LLC; Mickki D. Murray, Esq.

(57) ABSTRACT

Systems and methods are presented for a user-initiated process by which a voice mail retrieval number and/or voice mail deposit number can be reset without requiring the assistance of network customer support staff. In an exemplary embodiment, a voice mail retrieval number reset request can be in the form of a MAP-USSD message which, when received by a voice mail reset system results in the storage of the voice mail retrieval number at the communication device by over-the-air programming techniques. Likewise, a voice mail deposit number reset request can be in the form of a MAP-USSD message. The voice mail deposit number can be reset at an HLR by an ATM operation or a MAP-USSD message. In a further embodiment, the VMDN can be reset by sending an FSM message to the communication device.

14 Claims, 6 Drawing Sheets

USER INITIATED VOICE MAIL RESET SYSTEM

TECHNICAL FIELD

This invention relates in general to setting voice mail numbers associated of a communication device. In particular, the present invention relates to systems and methods for an automated voice mail reset system by which a user can reset a voice mail retrieval number and/or reset a voice mail deposit number associated with his device.

BACKGROUND OF THE INVENTION

Voice mail systems are well known in the art, as most telecommunication networks provide some array of voice mail services to their subscribers. Essentially, a voice mail system employs a centralized server to manage telephone messages for a large group of users. In addition to allowing a caller to leave a voice message in a subscriber's voice mailbox, services may include the ability to forward a message to one or more other voice mailboxes, store messages for future delivery, and notify a user when a message has been received.

Voice mail system operations can vary according to the particular network in which they are employed. Networks can vary the nomenclature associated with the components of a voice mail system and the methods used to implement the system, but the general principles of providing call forwarding conditions, and assigning numbers for voice mail deposit and retrieval can be used across network genres and proprietors. A typical mobile communications network includes a Home Location Registrar (HLR) in which subscriber customer information, including call forwarding information, is stored. The call forwarding information can include the conditions under which a call is forwarded to a voice mailbox so that a caller has the option of leaving a message for the subscriber. For example, a call can be forwarded to a designated voice mailbox if it is unanswered after three rings. The call forwarding information can also include a voice mail deposit number (VMDN), which is a number used by the network to forward a caller to the voice mailbox of the subscriber being called, and a voice mail retrieval number (VMRN), which is the number that a subscriber can call in order to hear voice mail messages that have been left in his or her voice mailbox. In many cases, the VMRN is stored in the 1 key of the subscriber's mobile telephone keypad, allowing the user to quickly and easily retrieve voice mail messages by simply pressing a single key. The VMRN can be stored in the 1-key manually, or more typically, by Over-The-Air (OTA) programming.

A typical network can operate numerous voice mail systems which are supported by a plurality of voice mail servers. In an effort to efficiently manage network resources, a network operator can reassign a subscriber's voice mailbox from one voice mail server to another, often referred to as performing a rehome operation, in which case a user's VMRN must be updated accordingly so that the user can continue to access his voice mail. After a rehome operation, the VMRN is typically updated via OTA programming protocols.

A problem can arise when OTA programming fails to successfully store the VMRN number. In many 2G networks in operation today, OTA failures can go undetected by the network, so that a second attempt is not performed. Consequently, a user can be left without a functional VMRN, as the newly assigned VMRN is not updated at the user's device. A problem can also arise when a user intentionally or inadvertently overwrites the VMRN stored in the 1-key. If the user has stored the VMRN in a different key on the keypad, or has otherwise stored or recorded the VMRN, then the user can still use the VMRN to access his voice mail messages. However, if the user failed to record the VMRN, and it is not stored on the user's telephone, the user will be unable to retrieve any voice mail messages. This situation compels a user to contact a customer service operator and explain the problem. Customer service personnel can address the problem by walking the user through a manual process by which the user can store the VMRN on his phone, or by making a further attempt to store the program via OTA programming. Either way, the customer is forced to engage in a call to customer service, which can result in costly phone service charges to the subscriber; and the network operator must pay customer service staff to manage voice mail retrieval problems.

Unlike the VMRN, a VMDN is not typically stored on a subscriber's phone. Generally, a VMDN is stored at an HLR along with other conditional call forwarding parameters used to direct a caller to the voice mailbox of a subscriber. However, even though it is stored at a carrier network location rather than at a user's phone, a user can still inadvertently clear the VMDN and prevent the voice mail system from operating properly. For instance, a user can cancel all call forwarding, in which case the VMDN, which is essentially a forwarding number, can be removed from the HLR. Without a forwarding number, a caller cannot be directed to a voice mailbox and given the opportunity to leave a message. Consequently, a user will often call customer service in frustration, complaining that his voice mail system is not functional. Again, human operator intervention is then required in order to reset the VMDN at the HLR so that unanswered calls can be directed to a subscriber's voice mailbox. Some networks protect a user from inadvertently losing call forwarding functions by performing a default process that automatically repopulates the VMDN at the HLR when a subscriber clears it. However, 3G networks may introduce innovative services which may not be compatible with the current default protection process. Consequently, when 3G services come online, a subscriber that clears his voice mail deposit number may be forced to speak with customer service to remedy the problem.

Often a carrier network will provide an automated customer support system that allows a user to access information without having to directly contact a customer service representative. However, voice mail reset operations have not been automated as they can require a more complex process to be performed, namely resetting a number at a user's phone or at an HLR.

There is a need for a system and method by which a user can reset a VMRN at a communication device without having to incur the time, costs, and inconvenience associated with directly contacting a customer service representative. There is a further need for VMRN reset methods that include a fail-safe alternative in case the primary reset procedure is not successful. There is further a need for systems and methods that allow a user to reset a VMDN without having to contact a customer service representative. There is also a need for methods by which a network can address user voice mail number reset problems without having to incur the costs of human operator time.

SUMMARY OF THE INVENTION

The present invention provides a user-initiated voice mail reset system (VMRS) that allows a user to reset a voice mail number without having to contact a customer service representative. A VMRS in accordance with the present invention can receive a voice mail reset request from a user's communication device and respond to the reset request by performing a reset process without the intervention of customer service personnel. An exemplary embodiment of a VMRS of the present invention can include a voice mail reset server (VMRSVR) to receive a voice mail reset request and direct a voice mail reset process in response to the voice mail reset request. In a first exemplary embodiment, the VMRN of a communication device is reset. In a further exemplary embodiment, the VMDN associated with a communication device is reset.

An exemplary method of resetting a VMRN includes: receiving a VMRN reset request from a communication device, retrieving the VMRN from a database and resetting the VMRN. In one exemplary embodiment, the VMRN request is in the form of a Mobile Application Part (MAP)—Unstructured Supplementary Service Data (USSD) message sent by a handset over a GSM network. In an alternative embodiment, the VMRN reset request is in the form of a MAP-USSD-like message represented by a special digit string over a non-GSM network. In an exemplary embodiment, the VMRS resets the VMRN at the communication device by providing the VMRN to an OTA platform which stores the VMRN at the communication device via over-the-air programming techniques. An exemplary method of the invention further includes sending a confirmation to the communication device that the VMRN has been successfully reset. In addition, an exemplary method can include sending the VMRN to the communication device via a SMS text message, so that the user can store the message for future reference. In the case of OTA failure or inadvertent overwriting of the number stored in the 1-key, the user can refer to the stored SMS message and manually store the VMRN in the 1-key, or other designated key selected by the user.

An exemplary method of resetting a VMDN includes: receiving a VMDN reset request, retrieving the VMDN, and resetting the VMDN at a platform that stores conditional call forwarding parameters for the communications network, referred to herein as a conditional call forwarding repository. For example, the conditional call forwarding repository can be a network HLR. In an exemplary embodiment, the VMDN reset request can be in the form of a MAP-USSD message sent over a GSM network. In a further exemplary embodiment, the VMDN reset request can be in the form of a special digit string that represents a MAP-USSD-like message sent over a non-GSM network. In a first exemplary embodiment, the VMDN can be delivered to a communications network HLR via an Any Time Modification MAP (ATM) operation. A method in accordance with the invention can further include sending a confirmation message to the communication device that the VMDN has been reset. In a second exemplary embodiment of the invention, a VMDN can be delivered to an HLR via a Mobile Application Part (MAP)-Unstructured Supplementary Service Data (USSD) message, and a MAP-USSD message can be sent to the communication device to notify the user that the operation was completed. In still a further embodiment of the invention, the VMDN can be delivered to the communication device via a SMS from an OTA platform.

The systems and methods of the present invention enable a user to initiate a process by which a VMRN or a VMDN can be reset at a network platform or at a communication device, without requiring intervention on the part of a customer service representative. Thus, the invention facilitates subscriber satisfaction with voice mail services while reducing costs for both the subscriber and the network operator.

DETAILED DESCRIPTION

As required, detailed embodiments of the present invention are disclosed herein. It must be understood that the disclosed embodiments are merely exemplary of the invention that can be embodied in various and alternative forms, and combinations thereof. As used herein, the word "exemplary" is used expansively to refer to embodiments that serve as an illustration, specimen, model or pattern. The figures are not necessarily to scale and some features can be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Generally speaking, the systems and methods described herein are directed toward resetting the Voice Mail Retrieval Number (VMRN) and the Voice Mail Deposit Number (VMDN) associated with a communication device via a user-initiated process that eliminates the need for human operator intervention.

Figure 1:
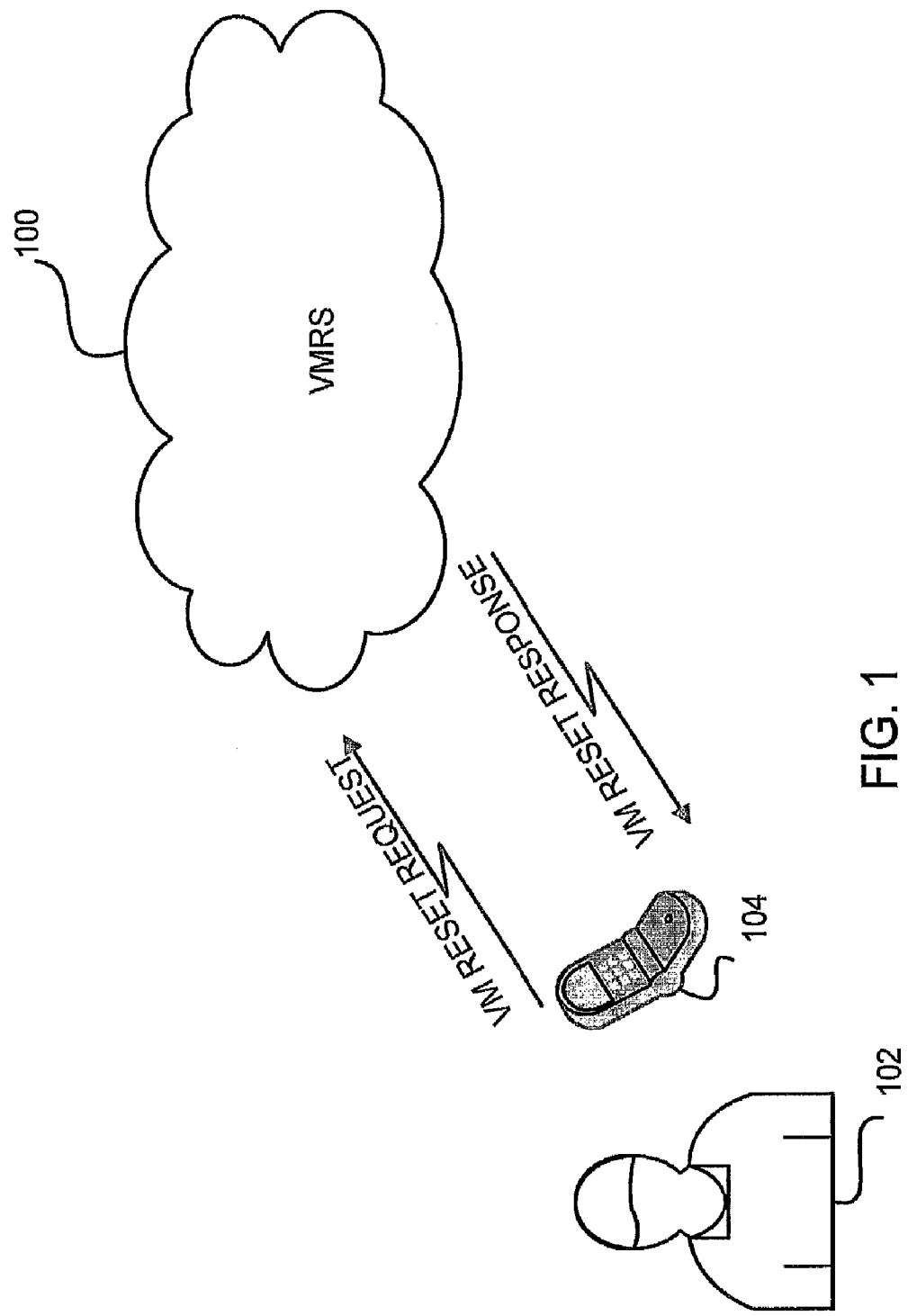
FIG. 1 illustrates an exemplary embodiment of a system of the present invention.

The methods and systems of the invention allow a user to reset a VMRN or a VMDN by sending a voice mail reset request message to a VMRS. Referring to the figures, wherein like numerals refer to like elements throughout, FIG. 1 shows a VMRS 100 in accordance with the invention. A user 102 with a communication device 104 can send a voice mail reset request to the VMRS 100, which in turn performs a process by which a voice mail reset response can be delivered to the communication device 104. Depending on the nature of the voice mail reset request, the voice mail reset response can be a VMRN reset, or a VMDN reset, and can also include a confirmation that either a VMRN or a VMDN has been reset by the VMRS 100.

Figure 2:
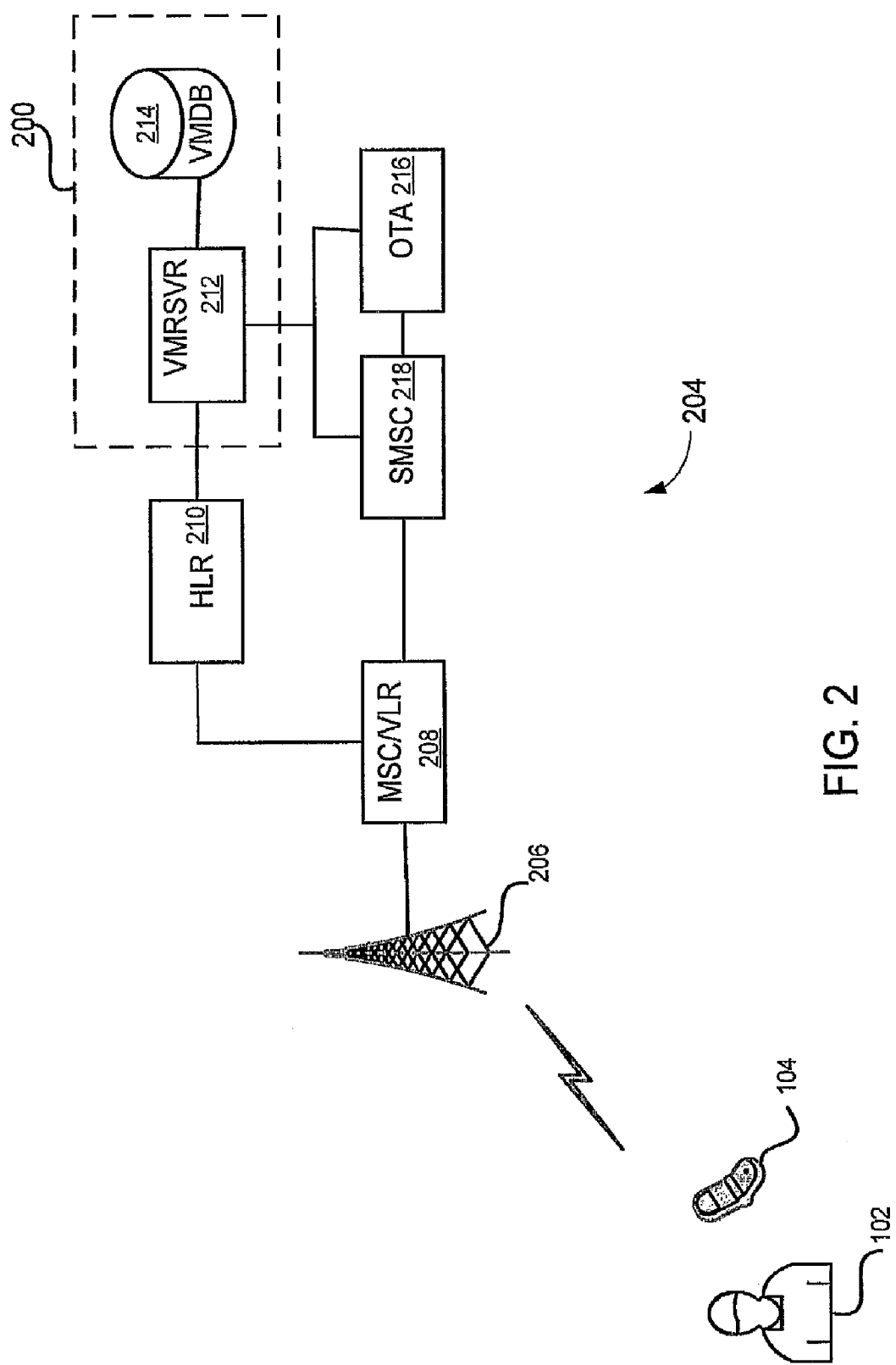
FIG. 2 shows an exemplary system of the invention.

FIG. 2 shows a Voice Mail Reset System (VMRS) 200 in accordance with an exemplary embodiment of the invention. Referring to FIG. 2, a user 102 is shown with a communication device 104 adapted to communicate over a mobile communications network 204 that includes a VMRS 200. The mobile communications network 204 can include a base transceiver station 206, a Mobile Switching Center (MSC)/Visitor Location Register (VLR) 210, a Home Location Register (HLR) 210, a VMRS 200, and an OTA platform 216. As known in the art, the base transceiver station 206 can transmit and receive wireless radio transmissions to and from the communication device 104. Typically the received transmissions are delivered to the MSC/VLR 208 which can comprise a call switching center adapted to coordinate call set ups for mobile network subscribers. The HLR 210 can contain subscriber information for the subscribers which can include conditional call forwarding information. The OTA platform 216 is adapted to send application-related information to the communication device 104, and thereby wirelessly store information and software at the user's device 104. OTA programming of a VMRN to a communication device 104 can be performed by sending a Short Message Service (SMS) message to the communication device 104. An SMS message can be sent to the communication device 104 in a predetermined format that enables the communication device 104 to recognize the message, extract the desired information, and store the information at the device. SMS messages can include activation instructions, Wireless Access Protocol (WAP) settings, ringtones, as well as other information. FIG. 2 shows a Short Message Service Center (SMSC) 218 adapted to store and forward SMS messages to the communication device 104. An SMS message can be sent to the communication device 104 from a computer or other communication device and can be stored at the SMSC 218 until the intended recipient turns on his cell phone or other communication device 104 and is within reception range. SMS messages can be sent over a control channel of the communications network so they can be received even if a user is engaged in a voice conversation.

As shown in FIG. 2, the VMRS 200 can include a Voice Mail Reset Server (VMRSVR) 212 and a Voice Mail Database (VMDB) 214. The VMDB 214 can be any database used to store network subscriber voice mail information such as a VMRN and a VMDN, and can also include other information as well. The VMRSVR 212 is adapted to query the VMDB 214 and receive information in response to the queries. As shown in FIG. 2, communication device 104 can be a cellular telephone, however, communication device 104 can also be a Personal Digital Assistant (PDA) or other communication device adapted to communicate over a network that provides voice mail services.

Figure 3:
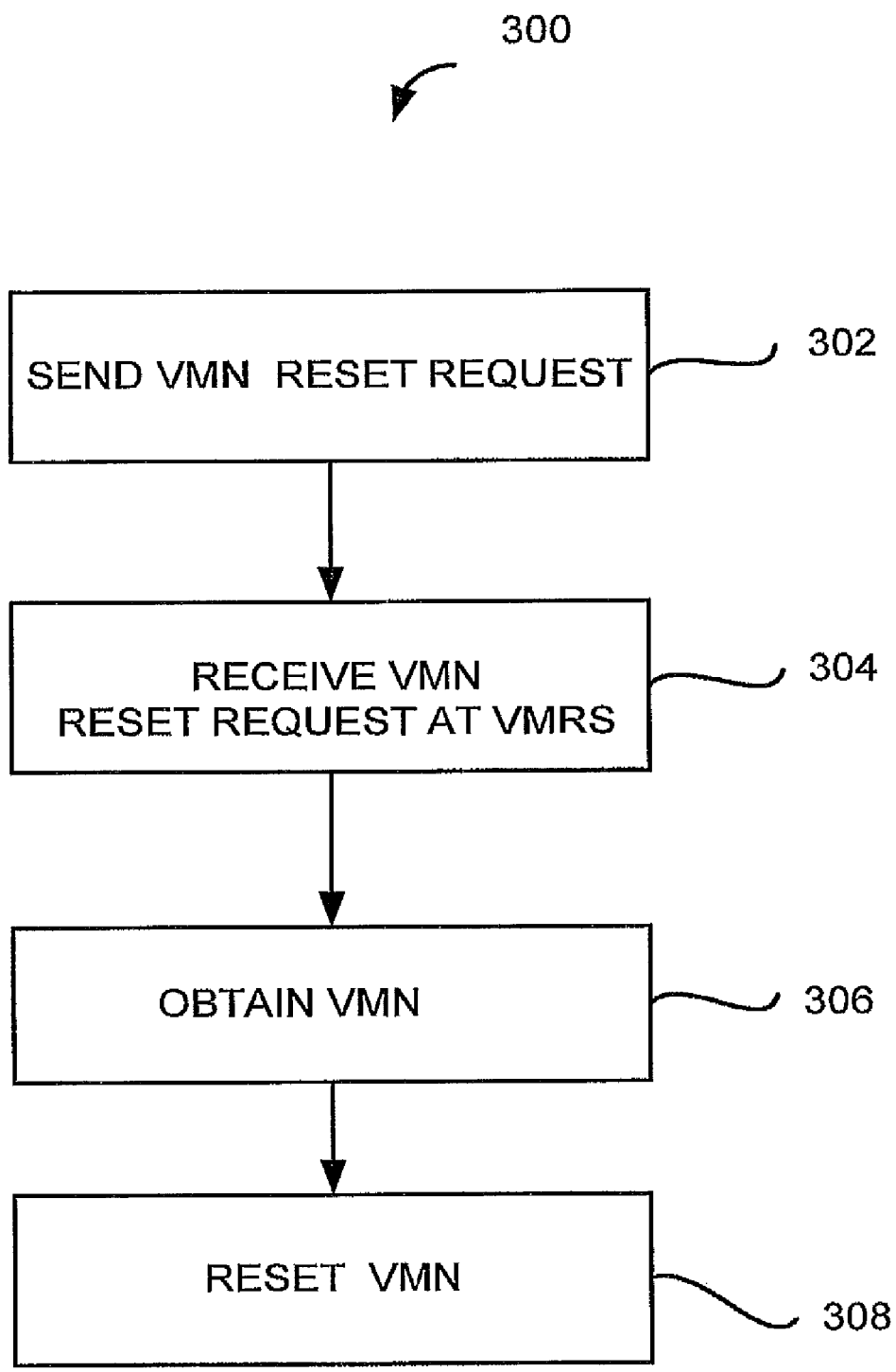
FIG. 3 shows a flowchart of a method in accordance with an exemplary embodiment of the invention.

FIG. 3 shows a flowchart of an exemplary method 300 of the invention for resetting a voice mail number (VMN) associated with the communication device 104. The VMN can be a VMRN or a VMDN and can be reset by a user-initiated process implemented by the system 200. Referring to FIGS. 2 and 3, assume the user 102 has lost his VMRN. The number could have been lost in several ways. For example, the network operator could have moved the voice mail system managing the user's voice mailbox from a first server to a second server, requiring the VMRN to be updated. The carrier network could have attempted to store the new VMRN in the 1-key of communication device 104 via OTA programming; however, unbeknownst to the network the OTA programming failed and the user 102 was left without a valid VMRN. When the user 102 calls his old VMRN, his communication device may not be recognized, in which case he may be unable to access his voice mail messages. As a further example, the user 102 may have stored an alternate number in the 1-key of the communication device 104, overwriting the VMRN previously stored there. When the user 102 later attempts to retrieve any voice mail messages he may have received, he may realize that the 1-key no longer connects him to his voice mail messages. Unless he has his VMRN stored elsewhere on the communication device 104, or has it otherwise recorded, the user 102 will be unable to access his voice mail.

Regardless of the manner in which the VMRN was lost, or never acquired in the first place, the user 102 can initiate a process that can remedy the problem in a manner that is time and cost efficient for both the user 102 and the network operator. In accordance with the exemplary method 300 of the invention, at block 302 the user can send a VMN reset request from the communication device 104 to the VMRS 200. In this case, the VMN request is a VMRN request. In a first exemplary embodiment, the communication device 104 can be a GSM cell phone and the VMRN reset request can be in the form of a MAP-USSD message. As known in the art, GSM phones are adapted to send MAP-USSD messages which can be transmitted over a GSM signaling channel and are typically used by a subscriber to inquire about prepaid services, such as an account balance, or to engage in an interactive menuing service such as downloading sports scores or stock market quotes. MAP-USSD messages are associated with real time session services rather than store and forward services which employ a SMSC to receive and store a message and then send it when a user is available. Typically MAP-USSD commands are routed to a subscriber's home network HLR so that roaming by a user does not affect MAP-USSD implementation. Because a MAP-USSD message is real-time oriented, response times can be shorter than for SMS services, allowing a user to receive a response to a MAP-USSD message within a few seconds.

MAP-USSD messages can often be associated with a unique dial string entered by the user at the communication device 104. Typically a MAP-USSD message dial string includes an asterisk followed by a series of digits and ends with a pound sign, for example, *5642#. The dial string can be entered by the user at the communication device 104 keypad, or can be stored in a designated key on the keypad. Alternatively, the dial string can be spoken at the communication device 104 for those phones adapted to receive voice commands from a user. The communication device 104 can be configured to send a MAP-USSD message, in this case a VMRN request, when a designated dial string is entered. As currently practiced in the art, a MAP-USSD message can include up to 180 characters. As practiced by the present invention, a MAP-USSD message representing a VMRN request can include headers identifying the message as a VMRN request, the phone number of the communication device, as well as other parameters associated with the communication device.

In a further embodiment of the invention, the VMRN request can be in the form of a MAP-USSD-like message that can be sent by a non-GSM phone and facilitated by a non-GSM telecommunications network, such as a TDMA or CDMA communications network. The MAP-USSD-like message can be associated with a designated dial string entered by a user and conform to a format established by a non-GSM network. In an exemplary embodiment the dial string associated with a MAP-USSD-like message can be shorter than the standard 10-digit dial string used to place a conventional phone call. Further information regarding a MAP-USSD-like message can be found in U.S. Patent Application No. 60/566,494 to Charles M. Link II, et al, which is entirely incorporated herein by reference. The MAP-USSD-like message can be represented by a unique digit string that can contain headers that identify the message as a VMRN request as well as other information such as the phone number of the requesting communication device.

A VMRN request transmitted by communication device 104 can be received at the VMRS at block 304. In an exemplary embodiment of the invention, the VMRN request can be received at the base transceiver station 206, then delivered to the MSC/VLR 208. As discussed earlier, MAP-USSD messages received at a MSC can typically be routed directly to the network HLR, in this case HLR 210. In the exemplary network configuration shown in FIG. 2, the VMRN request can be sent from the HLR 210 to the VMRSVR 212 of the VMRS 200. The MVRSVR 212 can be a dedicated MAP-USSD server, or other network server adapted to receive MAP-USSD messages. Although shown as a direct transfer in FIG. 2, in further embodiments of the invention the VMRN request can be otherwise routed and delivered to the VMRSVR 212 of the VMRS 200. At block 306 of FIG. 3, the VMRN of communication device 104 can be obtained. In the exemplary system 200, the VMRSVR 212 can query the VMDB 214 to obtain the VMRN. The VMRSVR 212 can use parameters contained in the VMRN request to query the VMDB 214. For example, the VMRN request can contain the phone number of communication device 104, which can be used by the VMRSVR 212 to look up the VMRN associated with the phone number in VMDB 214. The VMRN request can also contain other parameters that can also be used by the VMRSVR 212 to perform intelligent database operations to retrieve the VMRN associated with communication device 104.

At block 308, the VMRN can be reset at the communication device 104. In an exemplary embodiment, the VMRN can be reset via over-the-air programming facilitated by the OTA platform 216. The OTA platform 216 can perform the over-the-air programming by a variety of methods as known in the art. In an exemplary embodiment, the OTA platform 216 can direct that a SMS message be sent from the SMSC 218 to the communication device 104. The SMS message can contain the VMRN which can be stored in the 1-key of communication device 104. The SMS message sent as part of the programming process can be received by the communication device 104, recognized as a programming message and implemented without user 102 knowledge or intervention. In an exemplary embodiment, successful completion of OTA storage of the VMRN at the communication device 104 can prompt the OTA server 216 to send an acknowledgement to the VMRSVR 212. Upon reception of the acknowledgement, the VMRSVR 212 can initiate the delivery of a VMRN notice to the communication device 104 confirming that a VMRN has been stored. The VMRN notice can be in the form of a MAP-USSD message sent to the communication device 104 over a GSM network control channel that, when received, causes a confirmation message to be displayed to the user 102. In a further embodiment of the invention, the VMRN notice can be in the form of a MAP-USSD-like message sent over a non-GSM network, as discussed earlier herein, that results in a confirmation message displayed to the user 102.

Resetting the VMRN at block 308 can also include providing the VMRN to the user via a SMS text message sent from SMSC 218 to communication device 104. The SMS text message can be sent in a format that results in the text message being displayed to the user 102 so that the user can store the message at the communication device 104 for future reference if a subsequent problem with the VMRN should arise. An SMS text message containing the VMRN can be sent to the user in conjunction with OTA programming of the VMRN in the 1-key, or can be sent in the case that OTA programming fails to store the VMRN at the communication device 104. The SMS text message can also include instructions for the user describing the manner in which the user can manually store the VMRN. If the VMRN and the corresponding instructions exceed the 160 characters allowed in a SMS message, multiple SMS messages can be sent to accommodate the additional text.

Thus, the system and methods of the invention provide a way for a user to reset the VMRN at his mobile phone or other communication device. The VMRN reset process can be performed by a VMRS that can be incorporated into a GSM or non-GSM telecommunications network. In an exemplary embodiment the VMRN reset process can be implemented by MAP-USSD messages or the like that enable a user to send a VMRN reset request by entering a relatively short dial string. The reset request can be sent over a control channel of the telecommunications network and routed in a manner that allows a user to receive a quick response to his request.

The system 200 of FIG. 2 and method 300 of FIG. 3 can also be used to implement a user-initiated process to reset the VMDN associated with a communication device. Generally a user does not need to know his VMDN, also referred to as a pilot number, in order to retrieve his voice mail messages. However, he may realize that there is a problem with his VMDN if his voice mailbox is consistently empty and/or other people tell him that they are unable to leave a voice mail message for him. The user 102 can attempt to remedy the situation without invoking customer service personnel by sending a VMDN reset request from his communication device 104 to the VMRS 200.

Figure 4:
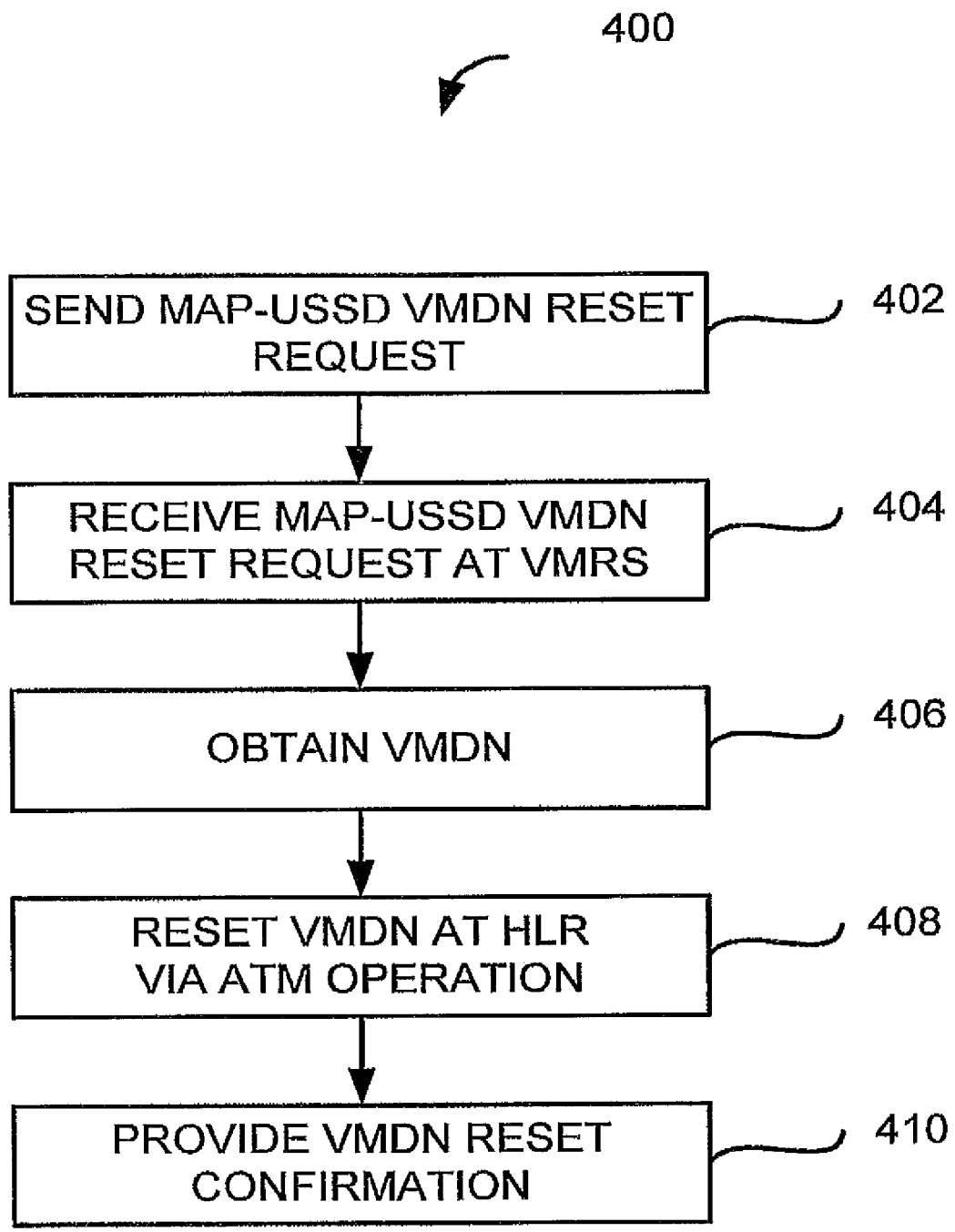
FIG. 4 shows a flowchart of a method in accordance with an exemplary embodiment of the invention.

Upon receipt of the VMDN reset request, the VMRS 200 can reset the VMDN by several methods. FIG. 4 shows a first exemplary method 400 of resetting the VMDN in accordance with the invention. At step 402 a VMDN reset request can be sent by the communication device 104. In an exemplary embodiment, the VMDN reset request can be in the form of a MAP-USSD message. Characteristics of MAP-USSD messages that can be sent over GSM networks and MAP-USED-like messages that can be sent over non-GSM networks were discussed above so will not be addressed here. However, it is noted that a VMDN reset request message, whether in a MAP-USSD format, a MAP-USSD-like format, or other format designated by a network carrier, can contain headers identifying it as a VMDN reset request, and in addition can contain information and parameters that can be the same as or can differ from the parameters contained in a VMRN reset request.

At block 404 the VMDN reset request can be received at the VMRS 200. As discussed previously in relation to the VMRN, the VMDN reset request can be routed to the HLR 210 which in turn can deliver it to the VMRSVR 212. At block 406 the VMRSVR 212 can query the VMDB 214 to retrieve the VMDN associated with the communication device 104. In an exemplary embodiment, the VMRSVR 212 can use information and parameters contained in the MAP-USSD VMDN reset request to retrieve the VMDN. For example, the MAP-USSD message can contain parameters related to Mobile Station Integrated Services Directory Number (MSISDN), International Mobile Station Identifier (IMSI), dialed USSD String, location information, call forwarding data, subscriber state or additional information. At block 408 the VMDN retrieved by the VMRSVR 212 can be reset at the HLR 210. In the exemplary method 400, the HLR 210 can be the network designated repository for conditional call forwarding information, meaning that when a VMDN is cleared, it is cleared from the HLR 210. Thus to reset the VMDN, the VMDN can be repopulated at the HLR 210. For networks in which conditional call forwarding information is stored at a different network designated repository, the VMDN can be reset by repopulating the designated repository, and the VMDN can be routed accordingly. As shown in FIG. 4, the VMDN can be reset at the HLR 210 by using an ATM operation. As known in the art, an ATM operation is a type of MAP function that can be implemented by mobile handsets and other communication devices. Examples of ATM functions include SCP service logic that is used to change GSM Supplementary Services like Call Forward. In an exemplary embodiment an ATM operation can be used to repopulate the VMDN at the HLR and reset the conditional call forwarding parameters. In an exemplary embodiment, a confirmation message can be sent from the HLR 210 to the MSC 208 at block 410. In an exemplary embodiment, the confirmation message can be in the form of USSD Notify or a Forward Short message that is automatically triggered when the VMDN is reset at the HLR 210. The confirmation message can be sent to the MSC 208 and can also be sent to the communication device 104.

Figure 5:
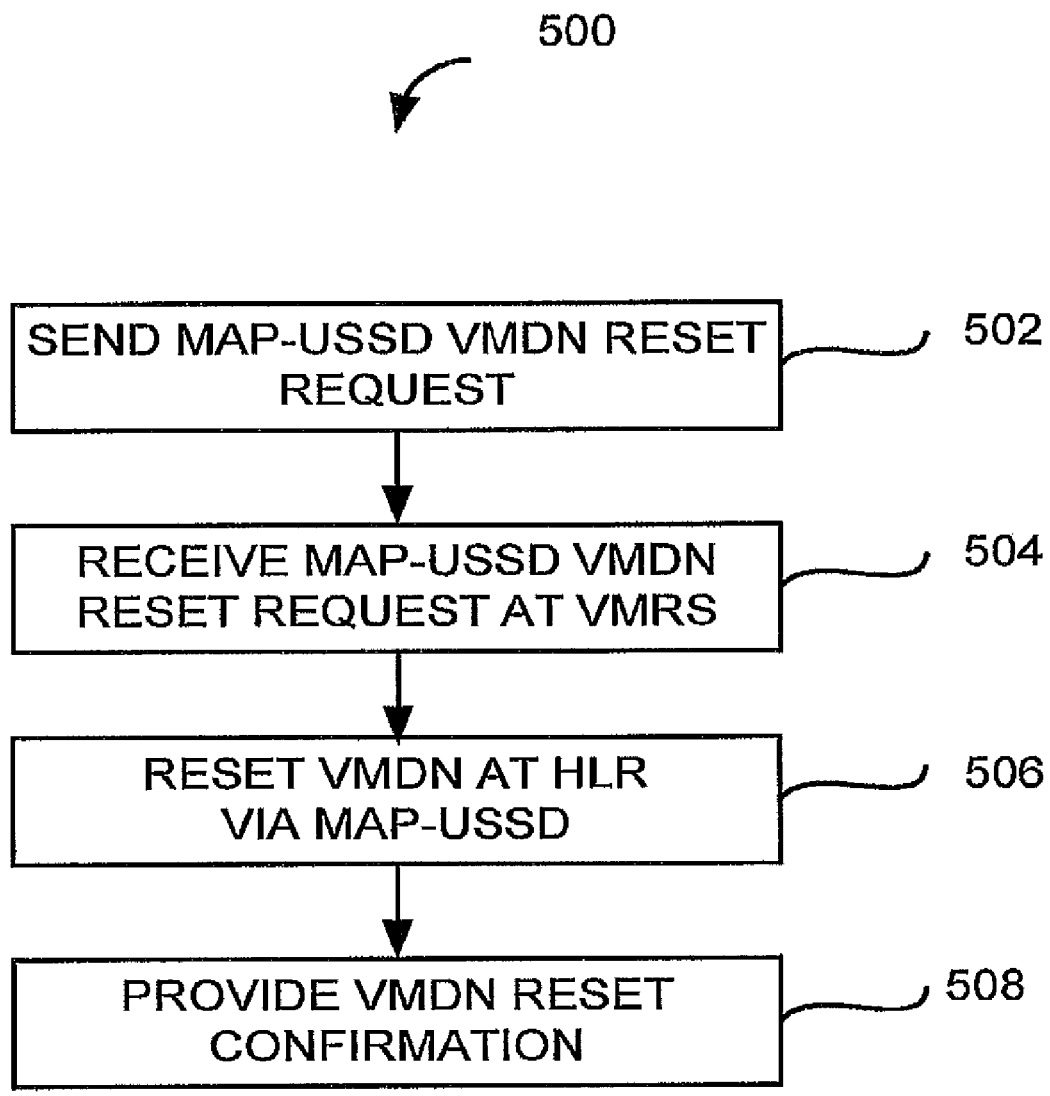
FIG. 5 shows a flowchart of an exemplary method of the invention.

FIG. 5 shows a further exemplary method 500 of resetting the VMDN of the communication device 104. At block 502 a VMDN reset request is sent from the communication device 104 to the VMRS 200. In an exemplary embodiment, the VMDN reset request is in the form of a MAP-USSD message sent by a GSM phone over a GSM network. In a further embodiment the VMDN reset request is in the form of a MAP-USSD-like message sent to a non-GSM network. At block 504, the VMDN reset request is received at the VMRSVR 212 in a manner similar to that previously discussed herein. The VMRSVR 212 queries the VMDB 214 in the manner discussed earlier in relation to block 406 of method 400; i.e. various parameters contained in the MAP-USSD message are used to query the VMDB 214 and obtain the VMDN. Once the VMDN is obtained by the VMRSVR 212 it can be reset at the HLR 210 at block 506. The VMDN can be provided to the HLR 210 via a MAP-USSD VMDN reset message. The HLR 210 can be programmed to decode the MAP-USSD VMDN reset message and extract the VMDN from the message payload. The HLR 210 can also be adapted to use parameters and information contained in the MAP-USSD reset response message to rewrite conditional call forward fields at the HLR 210. An exemplary method can further include sending a MAP-USSD VMDN reset confirmation message to the communication device 104 at block 508 so that the user 102 has notice that the VMDN reset process has been completed and notice that his voice mail should now function properly. In a further exemplary embodiment, the VMDN can be reset at the HLR 210 via a MAP-USSD-like message facilitated by a non-GSM network that can be decoded at the HLR 210 or other repository for conditional call forwarding information so that the VMDN can be repopulated therein.

Figure 6:
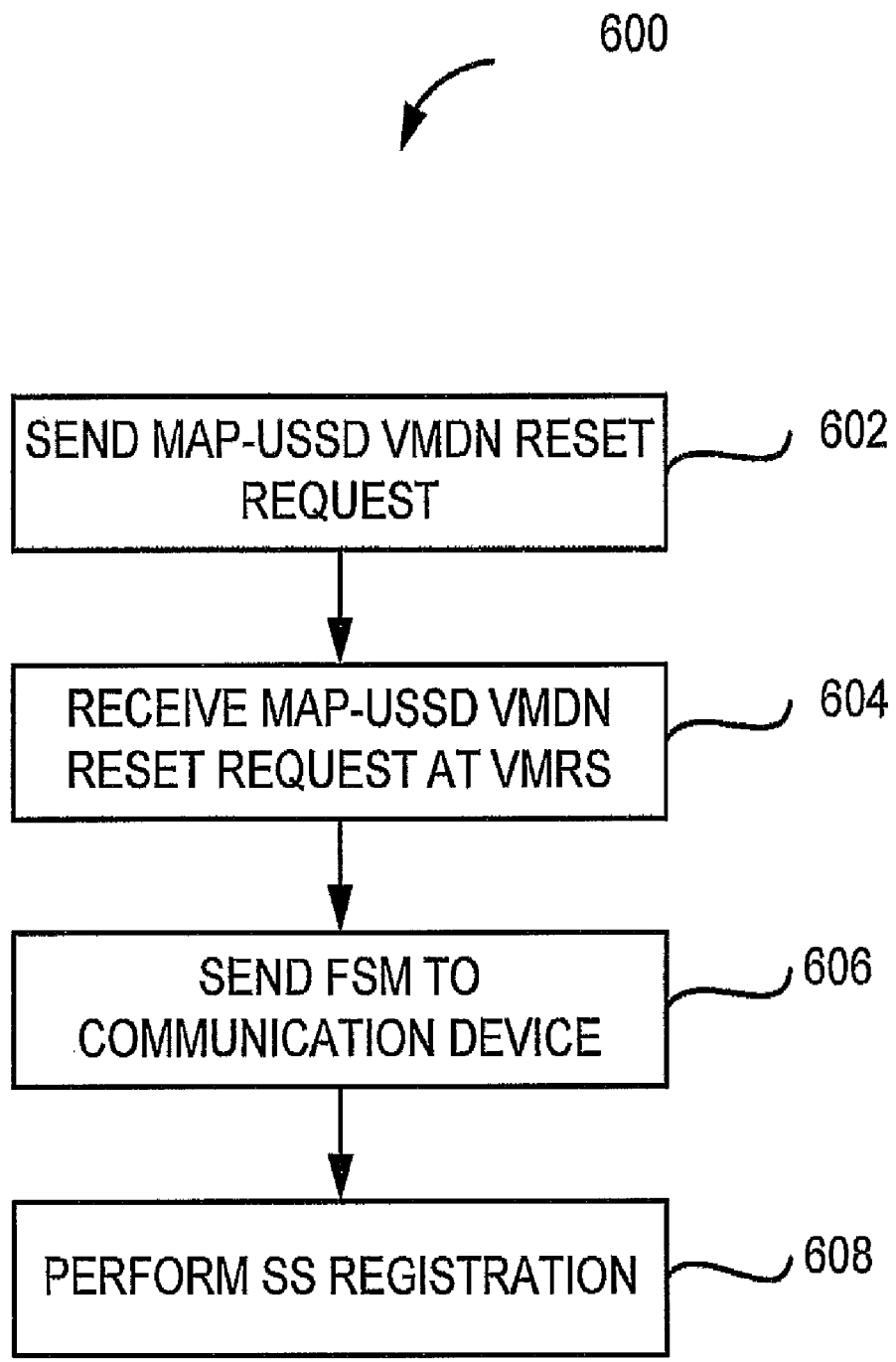
FIG. 6 shows a flowchart of an exemplary method of the invention.

FIG. 6 shows an exemplary method 600 for a user-initiated process by which a VMDN can be reset. Sophisticated contemporary handsets can allow a user to customize or reset his conditional call forwarding conditions by using a customization code designated by the network carrier. However, the reset process can require the user to supply his pilot number, which is his VMDN. The method 600 describes a process by which a user can acquire his VMDN and use it to reset his conditional call forwarding parameters at a network. At block 602 a VMDN request can be sent by the communication device 104. As discussed in relation to methods 400 and 500, in an exemplary embodiment the VMDN request can be in the form of a MAP-USSD message over a GSM network, or in a further embodiment, in the form of MAP-USSD-like message characterized by a special digit string transmitted over a non-GSM network. In this exemplary embodiment, the VMDN request is received at the MSC/VLR 208, forwarded to the HLR 210 and routed to the VMRSVR 212 where it is received at block 604.

In the method 600, the VMDN is reset by sending a Forward Short Message (FSM) to the communication device 104. To facilitate this process, the VMRSVR 212 can send a VMDN request to the OTA platform 216. The OTA platform 216 can include an OTA server (not shown) that is adapted to communicate with the SMSC 218 in order to send SMS messages. The VMDN request is formatted in such a manner that the OTA platform 216 recognizes the VMDN request and responds accordingly. In a first exemplary embodiment, the OTA platform 216 responds to the VMDN reset request by requesting the information required to send an FSM message to the communication device 104. To obtain the required routing information, a Send Routing Information for Short Message (SRI-SM) message can be sent to the HLR 210. In the exemplary system 200, SMS routing information is stored at the HLR 210, and the SRI-SM is sent to the HLR 210 by the VMRSVR 212.

In this exemplary embodiment, the HLR 210 returns the requested routing information via an SRI response message which is received at VMRSVR 212. In an alternative embodiment, the VMDN can be obtained from the VMDB 214 or other database accessible by the VRMSVR 212 or the OTA platform 216. In this exemplary embodiment, the VMRSVR 212 provides the FSM routing information and the VMDN to the OTA server 216. The OTA platform 216 can then use the routing information to send an FSM to the communication device 104 at block 606. The FSM message to the communication device can be sent from the SMSC 218, and can contain the VMDN associated with the communication device 104 as well as additional instructions for the communication device 104. For example, instructions contained in the FSM can compel the communication device 104 to perform an SS Register at block 608 by which all conditional call forwarding is directed to the VMDN supplied in the FSM.

In a further exemplary embodiment, the VMRSVR 212 can perform intelligent database operations to retrieve the VMDN from the VMDB 214 as well as the routing information required to send an FSM to the communication device 104 at block 608. Upon reception of the FSM message, the communication device 104 can complete the VMDN reset process by performing a mandatory SS registration.

The systems and methods presented herein describe a user-initiated voice mail reset system by which a user can reset the VMRN and the VMDN associated with his subscriber account. The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed:

1. A user initiated voice mail reset system, comprising:
a voice mail reset server; and
a communication device configured to create and send a user initiated voice mail reset request to the voice mail reset server, the user initiated voice mail reset request comprising a voice mail retrieval number (VMRN) reset request;
wherein the voice mail reset server is configured to:
receive the user initiated voice mail reset request from the communication device;
conduct a VMRN reset process in response to the voice mail reset request, the VMRN reset process resetting a VMRN associated with the communication device to a new VMRN; and
provide a VMRN reset response to the communication device, the VMRN reset response comprising the new VMRN.

2. A voice mail reset system, comprising:
a voice mail database;
a voice mail reset server coupled to the voice mail database, the voice mail reset server being configured to:
receive a voice mail reset request sent by a communication device, the voice mail reset request comprising a request to reset an existing voice mail retrieval number (VMRN) associated with the communication device;

querying the voice mail database in response to receiving the voice mail reset request to retrieve a new VMRN to which the existing VMRN is to be reset; and provide a voice mail reset response comprising the new VMRN to the communication device;

the voice mail database being configured to:

store the new VMRN; and provide the new VMRN to the voice mail reset server in response to the query.

3. The system of claim 2, further comprising a call switching center configured to receive the voice mail reset request from the communication device and direct the voice mail reset request to the voice mail reset server.

4. The system of claim 2, further comprising an over-the-air (OTA) platform, wherein the voice mail reset server is further configured to provide the voice mail reset response to the communication device by way of the OTA platform using over-the-air programming techniques.

5. The system of claim 2, further comprising a short message service center (SMSC), wherein the voice mail reset server is further configured to provide the voice mail reset response to the communication device by way of the SMSC by sending an SMS message comprising the voice mail reset response to the communication device.

6. A method for resetting a voice mail retrieval number (VMRN) associated with the communication device, the method comprising:

receiving, at a voice mail reset server, a voice mail number reset request from the communication device, the voice mail number reset request comprising a request to reset an existing VMRN associated with the communication device; and resetting, at the voice mail reset server, the existing VMRN to a new VMRN, in response to the voice mail number reset request.

7. The method of claim 6, wherein the voice mail reset request is in the form of a mobile application part-unstructured supplementary service data (MAP-USSD) message.

8. The method of claim 6, wherein resetting the existing VMRN associated with the communication device comprises querying a database for the new VMRN.

9. The method of claim 6, further comprising the voice mail reset server sending the new VMRN to the communication device via an over-the-air (OTA) platform using OTA programming.

10. The method of claim 6, wherein resetting the existing VMRN associated with the communication device comprises sending a mobile application part-unstructured supplementary service data (MAP-USSD) message to a network home location register (HLR), wherein the network HLR is configured to reset the existing VMRN in response to the MAP-USSD message.

11. The method of claim 6, further comprising sending the new VMRN to the communication device in a short message service (SMS) message.

12. The method of claim 6, further comprising sending a confirmation message to the communication device to inform a user of the communication device that the VMRN has been reset.

13. The method of claim 6, wherein the voice mail number reset request is in the form of a mobile application part-unstructured supplementary service data (MAP-USSD)-like message sent over a non-GSM network.

14. The method of claim 6, further comprising querying a database to obtain the new VMRN.

\* \* \* \* \*